United States Patent [19]
Gold

[11] Patent Number: 4,799,343
[45] Date of Patent: Jan. 24, 1989

[54] WINDOW ASSEMBLY

[76] Inventor: Peter N. Gold, 465 North Wood Rd., Rockville Centre, N.Y. 11576

[21] Appl. No.: 82,048

[22] Filed: Aug. 6, 1987

[51] Int. Cl.$^4$ .............................................. E06B 3/00
[52] U.S. Cl. .................................... 52/208; 52/823
[58] Field of Search .................... 52/204, 206–208, 52/308, 475, 476, 656, 732, 823

[56] References Cited

U.S. PATENT DOCUMENTS 2,576,392  11/1951  Downes ............................. 52/208
2,939,186  6/1960   Norwood ........................... 52/823

*Primary Examiner*—James L. Ridgill, Jr.
*Attorney, Agent, or Firm*—Collard, Roe & Galgano

[57] ABSTRACT

A window is disclosed which has a window frame with a generally Z-shaped flange. The Z-shaped flange has an inwardly facing generally V-shaped pocket. A window pane is provided which has generally V-shaped edges adapted to fit within the inwardly facing V-shaped pocket in the flange section. A track is disposed between the window pane and the window frame to permit sliding therebetween. The dimensions of the mating V-shaped pockets and V-shaped edge are such that upon installation the flat face of the window pane is flush with the outer leg of the Z-shaped flange member.

9 Claims, 3 Drawing Sheets

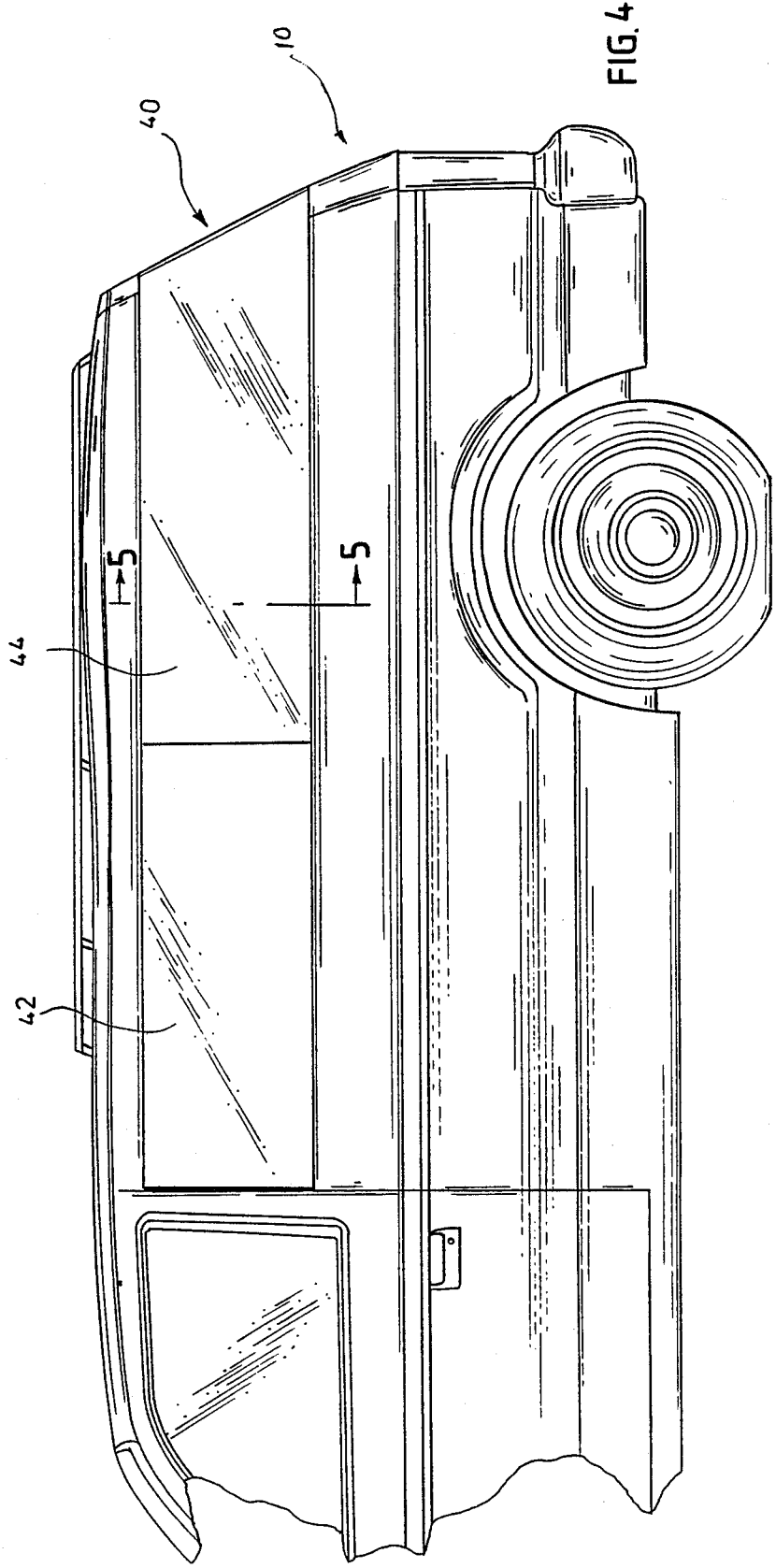

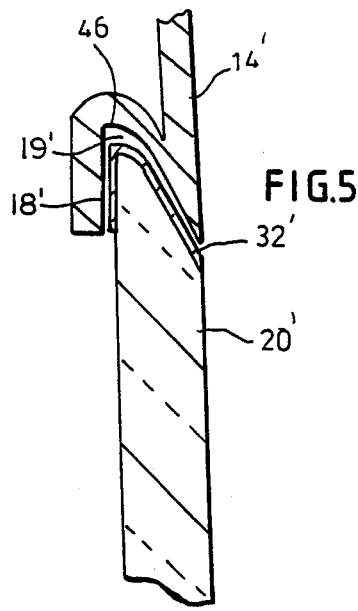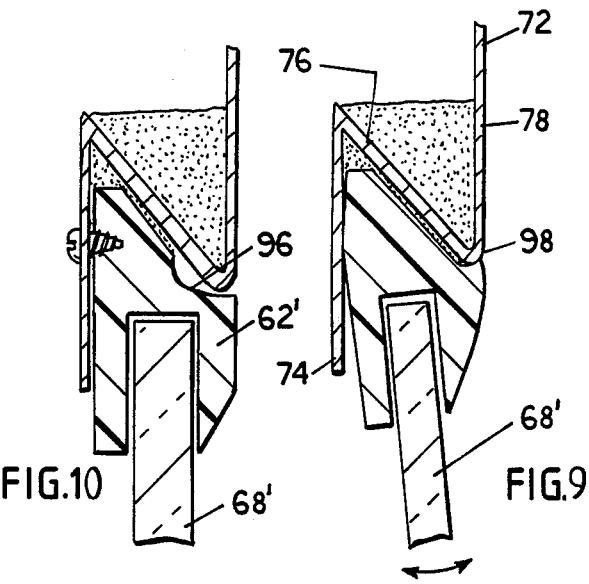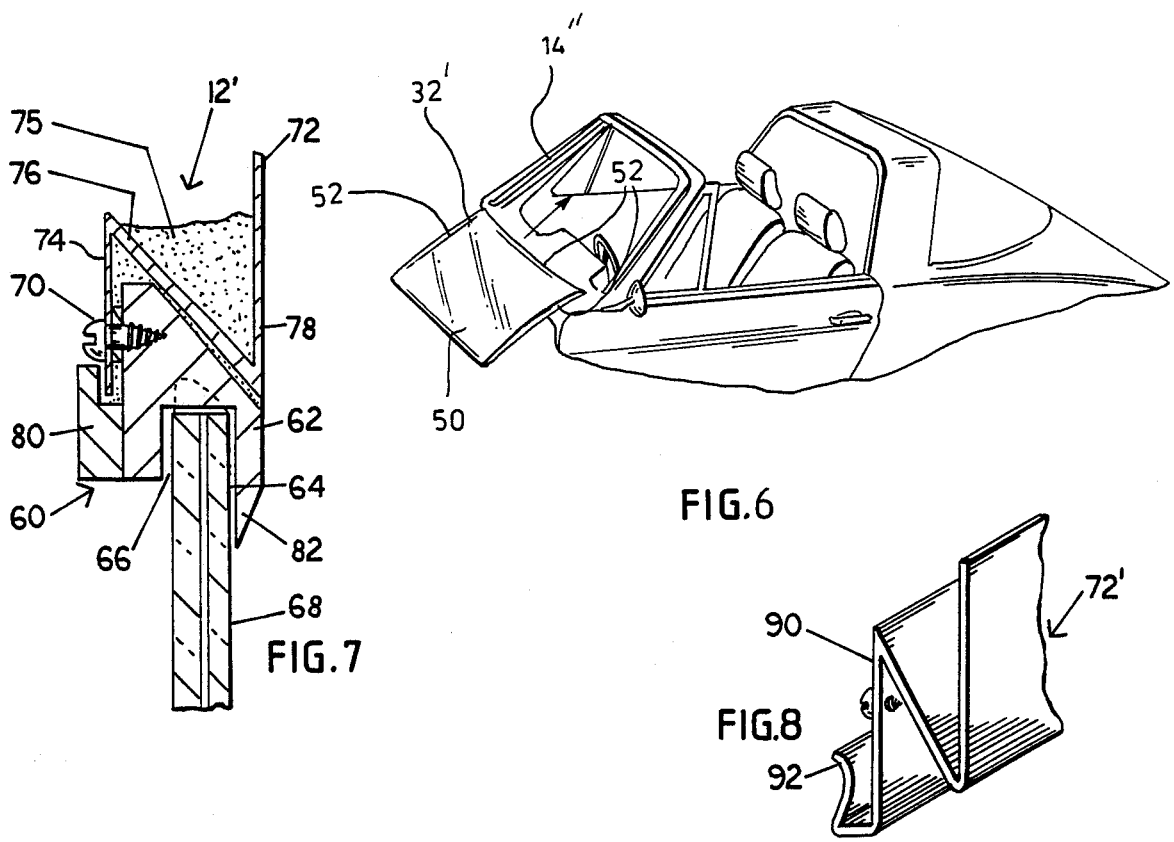

4,799,343

WINDOW ASSEMBLY

BACKGROUND OF THE INVENTION

1. Field of the Invention

This invention relates to a window frame design which allows a window pane to be slid into the frame in a manner which automatically seals the structure. More particularly, this invention relates to a window assembly for use in an automotive vehicle whereby the structure of the window assembly allows the window pane to be slid into a window frame for easy replacement.

2. Background of the Invention

It is often necessary to replace the windows and windshields of automotive vehicles. In the past this has required removal of the various elastomeric sealants from the windshield and rear windows of motor vehicles. In addition, in the case of a van, replacement of the side windows also requires removal of the elastomeric sealant for removal of the window. The replacement of windows requires their being resealed with elastomeric materials. There has been a long felt need in the automotive repair art for a quicker and simpler method of replacing windows.

In the present invention a window frame with a Z-shaped flange is provided, which flange can either be made integral when the vehicle is manufactured or can be attached to the existing window frame in a vehicle such as an automobile, van, truck, or even a boat. The arrangement of the present invention is particularly advantageous for use in making the normally non-slidable side windows of a van slidable. The construction of the window frame of the present invention permits for the sliding insertion of windows during replacement and, for that matter, would permit sliding of side windows, such as on a van, after installation where the added flange sections are split and overlapped. Also, the arrangement of the present invention is particularly advantageous for use in making stationary, sliding and hinged windows. By integrating both the glass and the vehicle structure together more efficiently to be inter- and intra-sensitive together.

When replacing a windshield on an automotive vehicle or boat, the flange portion of the window frame of the present invention can be screwed, bolted or riveted to the existing window frame and the window pane may be merely slid into place. If the window in the frame of the present invention had to be then again replaced, this could be accomplished in a matter of minutes by sliding out the cracked window or windshield and sliding in a new window pane. The window assembly of the present invention of course could be used in any application where windows might require replacement such as a house or a garage.

SUMMARY OF THE INVENTION

It is an object of this invention to provide a window which has a frame composed of a generally Z-shaped flange which may be either formed from the exterior sheet metal of a vehicle or fixedly mounted around an existing window opening in such a vehicle.

It is another object of the present invention to provide a window pane adapted to mate with a Z-shaped flange by merely appropriately shaping the edge portions thereof to mate with a generally V-shaped pocket within the window frame.

It is still one additional object of the invention to provide a track member which can fit over the shaped edge portion of the window pane, or within the pocket of the Z-shaped window frame flange, to permit sliding between the window pane and the window frame.

It is still a further object of the invention to provide an economical means for converting the non-slidable side windows of a vehicle, such as a van, to slidable windows by appropriately attaching the Z-shaped flange to the window frame.

It is still one additional object of the present invention to provide a window for a vehicle which is economical to manufacture, easy to install and which is sealed without the use of elastomeric sealing materials.

These and other objects of the present invention are disclosed in a preferred embodiment of the invention which includes a window frame having a generally Z-shaped flange. The generally Z-shaped flange has an inwardly facing generally V-shaped pocket. The pocket has one leg extending toward the inside of the vehicle and second leg extending outwardly to the outside skin of the vehicle. A window pane is provided which has a generally V-shaped top and bottom edge adapted to fit within the inwardly facing V-shaped pocket of the window frame. A track member is provided to be disposed between the window pane and the pocket to permit sliding therebetween. The pocket and the V-shaped edge of the window pane are dimensioned such that the window pane with the track member thereon may be slid within said pocket with the outside face of the pane flush with the outside of the vehicle.

These and other objects and advantages of the present invention will become apparent from the following description of the accompanying drawings, which disclose several embodiments of the invention. It is to be understood that the drawings are to be used for the purpose of illustration only, and not as a definition of the invention.

BRIEF DESCRIPTION OF THE DRAWINGS

FIG. 4 is a side view of a motor vehicle including a side window of the present invention;

FIG. 5 is a partial cross-sectional view of the window shown in FIG. 4 along the lines 5—5;

FIG. 6 is an isometric front view of an automotive vehicle with a windshield of the present invention about to be inserted thereon;

FIG. 7 is a cross-sectional view of the edge of a second embodiment of the window assembly of the present invention;

FIG. 8 is a cross-sectional view of the Z-shaped flange of the present invention including a U-shaped clip for affixing interior trim;

FIG. 9 is a cross-sectional view of the window frame area of another embodiment of the present invention shown in a first position; and FIG. 10 is a cross-sectional view of the window frame assembly as show FIG. 9 in a second position.

DESCRIPTION OF THE PREFERRED EMBODIMENT

Figure 1:
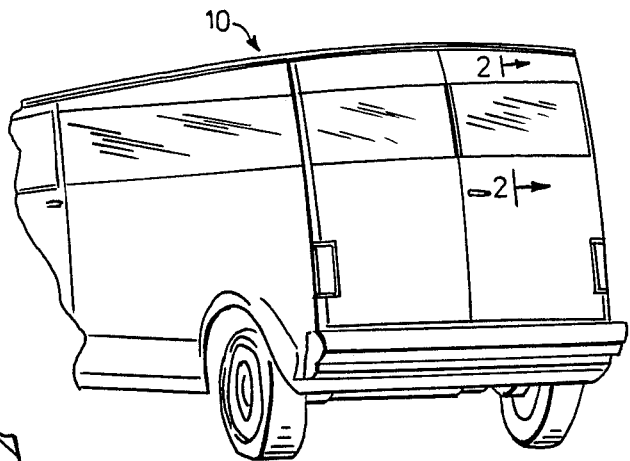
FIG. 1 is a rear isometric view of an automotive vehicle including the window of the present invention.

There is shown in FIGS. 1 and 4 a motor vehicle, generally denoted as 10, which includes the window of the present invention. The window assembly, generally denoted as 12, may be located in any position on a generally vertical surface of the motor vehicle (10) such as, for example the windshield, the side windows or the rear window of the motor vehicle.

Figure 2:
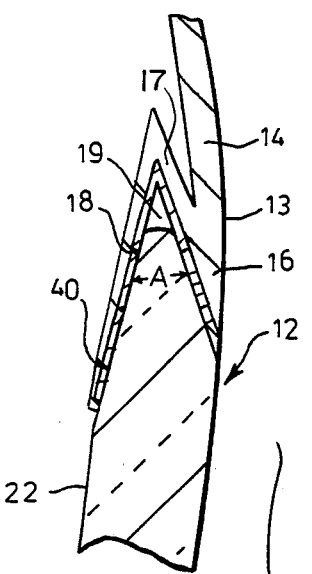
FIG. 2 is a cross-sectional view of the window shown in FIG. 1 along the lines 2—2.
Figure 2:
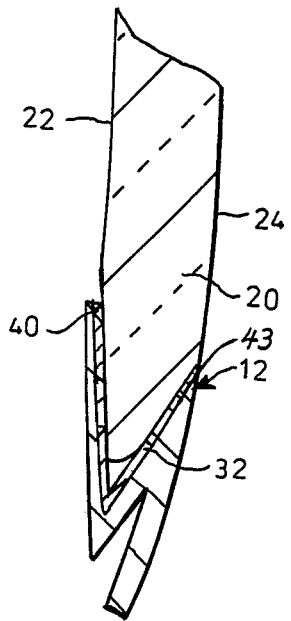
Figure 3:
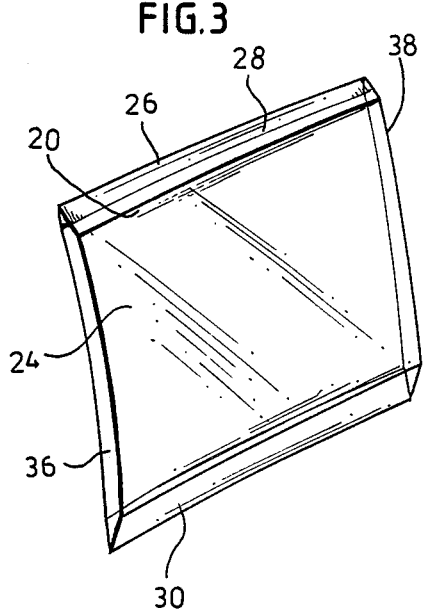
FIG. 3 is an isometric view of the window pane of the present invention.

As can be best seen in FIG. 2 the window 12 of the present invention includes a frame 13 with generally Z-shaped horizontal runs, including horizontal flange portion 14 having an outer leg 16, which is normally the outer skin or surface of the vehicle 10. The flange 14 also includes an inner leg 18 which extends generally inwardly towards the inside of the motor vehicle 10. A generally V-shaped pocket 19 is formed by outer cross leg 17 and inner leg 18 of the flange 14. The pocket 19 faces inwardly of the frame 13 and may be of any predetermined width depending on the thickness of the window utilized.

Normally the Z-shaped flange is formed of a metal such as steel but can be made of a plastic or fiberglass material. As indicated above, for an original equipment installation of the window 12, the leg 16 is formed from the outer skin or sheet metal of the vehicle. If the application in which the window 12 is used is for replacement of an already existing vehicle window, then the leg 16 would be placed around the outer periphery of the existing opening and the frame 13 permanently attached to the already existing metal surface of the vehicle such as by riveting.

The window pane 20 of the present invention has a generally flat inner surface 22 and a generally flat outer surface 24. The edges 26 of the window pane 20 at least at the top 28 and bottom 30 thereof have a tapered cross section. This taper runs outwardly of the vehicle 10 and towards the center of the window opening defined by frame 13, from the inside 22 to the outside 24 of the window pane 20. The taper of edge 26 has a generally V-shaped cross section denoted as "A" in FIG. 2 and is adapted to fit within the generally V-shaped pocket 19 formed by the cross leg 17 and inner leg 18 of the flange member 14.

The tapered edge 26 of the window pane 20 of the present invention may be formed from a window pane having a rectangular cross section by any conventional means such as grinding or milling or may be formed with the taper during manufacture.

A track member 32 is attached to the tapered edge portion 26 of window pane 20. The track member 32 may be made of a metal, such as steel, or may be made of a hard plastic material. In either case the material of the track 32 protects window pane 20, which is normally made of glass, from being damaged by contacting flange 14 which is normally made of a metal such as steel. The track 32 is normally attached to the flange 26 of the window pane 20, but may be attached inside the pocket 19 of Z-shaped flange 14. If the track 32 were to be inserted within the flange 14, it would be contemplated that the V-shape cross section of the track 32 would be greater than the width of the pocket 19 so that, upon insertion, the track would be resiliently held within the pocket 19. In this embodiment the track 32 would be made of a material compatible with the glass sliding therein.

Conversely, if the track 32 were to be inserted on inclined edge 26 of window pane 20, the cross section of the V-shaped pocket 32 would be formed somewhat narrower than the cross section "A" of edge 26. This dimensioning again would allow the track to be resiliently held on the window pane 20. Of course the track may be permanently attached to either the edge 26 of the window pane 20 or the pocket 19 such as by using a bonding agent or by using a mechanical fastening device.

The track 32 permits sliding between the window 20 and the track 14 as when the window 20 is replaced. During replacement it is contemplated that window pane 20, with track 32 mounted thereon, would be slid within the pocket 19 formed between leg 18 and leg 17 of horizontal flange 14 until abutment with the vertical edge of frame 13 occurs. Normally this would take place with the sliding occurring on track 32 mounted on the top and bottom portions 28, 30 of window pane 20 with sides matching a rectangular cross section of the vertical runs of frame 13. In this embodiment the edges 36, 38 of window pane 20 could have a rectangular cross section. Of course the window can be slid in place vertically whereby the left edge 36 and the right edge 38 would be tapered and would also be equipped with the track 32 as well as the top and bottom edges 28 and 30. Also the window pane 20 can be flexed to allow insertion into a frame having the Z-shaped flange 14 on three or all sides.

The preferred flange 14 of window frame 13 is dimensioned such that the front surface 24 of window pane 20 is flush with outer leg 16 of flange 14 to present an aesthetically pleasing appearance on the exterior of the vehicle. This is accomplished by dimensioning pocket 19 in view of the thickness "A" of the window pane and the thickness of track 32.

Preferring now to FIGS. 4 and 5, there shown a motor vehicle 10 having a side window generally denoted as 40 which has two window sections 42 and 44 at least one of which is capable of sliding with respect to the frame 14' shown in FIG. 5. The track member 32 is again disposed between the open pocket 19' and the window pane 20' to facilitate the sliding of the window pane 20' within track 14'. In this embodiment of the invention it is advantageous to permanently affix the track 32 to either the inside wall 18! of flange 14' or the edge of the window pane 20'.

Permanent attachment of track 32 in any of the embodiments shown in FIGS. 1-5 may be by the use of any bonding agent or the use of a silicon rubber sealant 46 placed in the pocket 19, 19' or an edge 26 and capable of holding the track 32 on edge 26 or inside the pocket of flange 14, 14'. The bonding agent or sealant also provides additional sealing between track 32, the flange 14, 14' and window 20, 20'. The addition of a silicon sealant between the pocket 19, 19' and the track member 32 would not prevent the sliding action between the window pane 20 and the track 32. In addition, if continual sliding is not required a sealant may be used on both sides of track 32 with the window pane 20 being installed prior to the sealant curing.

Referring to FIG. 6 there is shown an additional embodiment of the window assembly of the present invention wherein a windshield 50 is provided with a bevelled edge 52 for insertion into a flange 14" essentially as described above. A track 32' is then placed around the bevelled edge of the windshield 50 in the manner taught so that the windshield may be slid into the flange 14" upon installation or replacement. The sealing properties again could be enhanced by use of a silicon sealant bead applied within the pocket of the track 14". The bottom of the windshield may be sealed in any conventional manner.

Referring to FIGS. 7 through 10, there is shown an additional embodiment of the present invention in the form of a window assembly 12' having a diagonal pivot hinge, generally denoted as 60 which includes a diagonal resilient flange member 62 having a rectangular opening 64 therein, capable of surrounding a rectangular edge 66 of a glass pane 68. As shown in FIG. 7 the glass pane 68 is laminated safety glass but may be tempered glass, chemically treated and/or hardened glass, or may be made from plastic. Generally rectangular edge 66 is capable of being received within opening 64 of the diagonal resilient flange 62. The resilient flange 62 may be attached to the edge of glass pane 68 by either a "friction fit" or may be attached thereto with any bonding agent or sealant (not shown).

Also shown in FIG. 7 is a screw 70 which mechanically fastens resilient flange 62 within the generally Z-shaped flange member 72. A sealant, 75 such as silicon, or a urethane foam, may be used between inner leg 74 and cross leg 76 of Z-shaped flange 72 to further fasten and hold resilient flange 62 within Z-shaped flange 72. In addition, the polyurethane material, which upon hardening, is rigid, may be used between leg 76 and outer leg 78 of the Z-shaped flange to provide rigidity for the flange structure. A stationary grip 80 temporarily holds resilient flange member 62 with window pane 68 therein, in position relative to flange 72 until the various bonding agents such as urethane 75 harden. It can be seen that by utilizing screw 70 and the urethane hardening agent 75, that there is sufficient support for the glass 68 such that a Z-shaped flange is not required at the bottom of the window assembly 12' to provide support for the glass 68 and therefor the bottom of glass pane 68 may be sealed in any conventional manner.

The preferred resilient flange member 62 includes a leg 82 which extends and captures the outer surface of glass pane 68. The leg 82 further adds to the sealing qualities of the diagonal proof hinge 60. Leg 82 along with the other features of resilient member 62 may be readily formed by well-known injection molding techniques.

In FIG. 8 there is shown a generally Z-shaped flange 72' for the vertical and/or horizontal edges of windows utilizing pivot hinge 60. The flange has a leg 90 which includes a shroud or trim clip 92 for affixing interior trim which is to be mounted around the window on the interior thereof. Optionally, the flange 72' can be used as a parallel Z-shaped reinforced structure which, in a number of ways, adds to the structural stength of Z-shaped flange 72. Flange 72' is adapted to be superimposed over cross leg 76 of flange 72 shown in FIG. 7, to thereby reinforce the structural rigidity of the cross leg 76 and, in effect, provide a double wall support.

FIGS. 9 and 10 disclose a generally V-shaped flange with a variation of the resilient flange member 62 mounted therein. In this embodiment, the resilient flange 62' includes a cut-out area 96 which allows window pane 68' to be rotated along the longitudinal extent thereof so that the bottom edge of the window pane 68 may be moved towards or away from the window frame assembly in the direction of the arrows of FIG. 9. The limit of the outward rotation of window pane 68' is provided by the interaction between cutout 96 and tip 98 of leg 78 of outer flange 72.

During installation the window 68' with hinge 60 thereon is inserted in the V-shaped opening between inner leg 74 and cross leg 76 with the bottom thereof rotated outwardly. The resilient flange 62' is deformed as shown in FIG. 9. The bottom of the window 68' is then rotated inward and the member 62' takes the shape shown in FIG. 10. Thus the window 68' with the member 62' may be inserted in a frame 72 with relatively little open space below the bottom of the window area. Screw 70 can then be inserted to retain the assembly in the window frame.

The resilient flange member 62 or 62' takes the place of track member 32 and, having a generally V-shaped cross section, eliminates the necessity for shaping the edge 26 of window pane 20 or the edge 66 of window pane 68 into a V-shaped cross section. In addition, the resilient flange 62, 62' provides an easily accessible point for which to mechanically attach the window to Z-shaped flange 72. The structure shown in FIGS. 7 through 10 provides the additional advantage of permitting some torsional movement of the window either in normal use or in accident situations. The energy absorbed in flexing and compressing resilient flanges 62 and 62' reduces forces transmitted to an object impacting the glass.

In the embodiment of FIG. 1, the sealing between window pane 20 or 68 and flange 14 or 72 may be enhanced by having the tip 40 of inner leg 18 of flange 14 extend further inward than the tip 43 of outer leg 16. This structure insures that, at least in the bottom flange portion of window frame 13, any water entering between the window pane 20 and leg 16 of the flange 14 can not reach the interior of the vehicle because the water cannot flow higher than the tip 43 of leg 16.

The foregoing description is illustrative of the present invention and various modifications and embodiments have been suggested and others will be readily available to those skilled in the art. Accordingly, it is intended that the present invention be limited only by the scope of the appended claims.

What is claimed is:

1. A sliding automotive window comprising:
   a window frame having generally parallel upper and lower longitudinally extending portions, each having a generally Z-shaped flange having an inner leg and an outer leg connected by a cross leg, said inner and cross leg of said Z-shaped flange forming an inwardly facing generally V-shaped pocket having a first predetermined cross section;
   a window pane having generally parallel upper and lower generally V-shaped edges having a second predetermined cross section defined by inner and outer legs of said V-shaped edge of said window pane, said second predetermined cross section being smaller than said first predetermined cross section, said window pane thereby being adapted to fit within said inwardly facing generally V-shaped pocket of each of said upper and lower portion of said Z-shaped flanges; and
   a track member made of material having a predetermined thickness fixedly attached to said inner and outer legs of said edges of said window pane and disposed between said upper and lower generally V-shaped edges of said window pane and the generally V-shaped pocket of said Z-shaped flange, said first predetermined cross section being greater than the sum of said second predetermined cross section and said predetermined thickness of said track member mounted on said inner and outer legs of said edge of said window pane to provide a clearance between said track member and said inwardly facing V-shaped pocket sufficient to permit said window pane with said track member thereon to slide in said V-shaped pocket of said window frame.

2. The automotive window as set forth in claim 1 wherein at least the lower longitudinally extending portion of said generally Z-shaped flange of the window frame has its inner leg extending inwardly of the frame a distance greater than its outer leg to insure proper drainage of water over said outer leg.

3. The automotive window as set forth in claim 1 wherein said track member is a steel strip with a generally V-shaped cross section including an inner and outer leg portions, said V-shaped cross section having a width less than the second predetermined cross section of said V-shaped edges of said window pane whereby insertion of said steel strip on said window pane causes the inner and outer leg portions thereof to be resiliently captured on the V-shaped edges of said window pane.

4. The automotive window as set forth in claim 3 wherein said outer leg of said steel strip is the same length as the outer leg of said V-shaped edge of said window pane.

5. The automotive window as set forth in claim 3 wherein said first predetermined cross section of said generally V-shaped pocket on said Z-shaped flange is predetermined such as to be capable of receiving said V-shaped edge of said window pane with said track member mounted thereon in a position whereby an outer surface of said window pane is flush with the outer leg of said generally Z-shaped flange.

6. An automotive window comprising:
a window frame having generally parallel upper and lower longitudinally extending portions, at least one of said upper and lower longitudinally extending portions having a longitudinally extending, generally Z-shaped flange having an inner leg and an outer leg connected by a cross leg and forming an inwardly facing, generally v-shaped pocket defined by the inner leg and the cross leg of said Z-shaped flange and having a first predetermined cross section;

an elongated, generally V-shaped resilient flange member having a second predetermined cross section being less than said first predetermined cross section, said resilient flange member thereby capable of being inserted into said generally V-shaped pocket of said Z-shaped flange along the longitudinal extent thereof, said resilient V-shaped flange member having an recess therein facing inwardly of said window frame formed along the longitudinal extent thereof said recess formed therein having a predetermined width;

a window pane having generally parallel upper and lower edges, each having a thickness equal to or less than said predetermined width of said recess in said resilient V-shaped flange member, thereby permitting insertion of said window pane into said recess; and means for fastening said resilient member with said window pane inserted therein to said generally Z-shaped flange.

7. A window as set forth in claim 6 wherein said means for fastening said resilient member to said generally Z-shaped flange is a threaded fastener to extending through said inner leg of said generally V-shaped pocket and into said resilient member.

8. A window as set forth in claim 7 wherein said resilient member includes a cutout portion along an edge thereof adjacent said cross leg of said generally Z-shaped flange.

9. A window as set forth in claim 6 wherein the insertion of said window pane with said resilient member thereon into said V-shaped pocket is facilitated by rotating said resilient member with said window pane thereon, towards said cross leg of said flange whereby said rotation is limited by the depth of said cutout portion.

* * * * *